United States Patent [19]

Friebe

[11] Patent Number: 5,674,963

[45] Date of Patent: Oct. 7, 1997

[54] PREPARING REACTION PRODUCTS FROM POLY (DIORGANOSILOXANES)

[75] Inventor: Robert Friebe, Leverkusen, Germany

[73] Assignee: Bayer Aktiengesellschaft, Leverkusen, Germany

[21] Appl. No.: 697,398

[22] Filed: Aug. 23, 1996

Related U.S. Application Data

[63] Continuation of Ser. No. 421,824, Apr. 13, 1995, abandoned.

[30] Foreign Application Priority Data

Apr. 20, 1994 [DE] Germany ............ 44 13 706.0
Oct. 13, 1994 [DE] Germany ............ 44 36 536.5

[51] Int. Cl.⁶ .................................................. C08G 77/08
[52] U.S. Cl. ............................ 528/14; 528/21; 528/34
[58] Field of Search ................................. 528/21, 34, 14

[56] References Cited

U.S. PATENT DOCUMENTS 4,611,040  9/1986  Olson et al. .
5,086,145  2/1992  Takashi et al. .................. 528/21

FOREIGN PATENT DOCUMENTS 2141985  8/1995  Canada .
0508490  10/1992  European Pat. Off. .
0576165  12/1993  European Pat. Off. .
0652245  5/1995  European Pat. Off. .
0672702  9/1995  European Pat. Off. .

OTHER PUBLICATIONS

Database WPI, Derwent Publications Ltd., London, GB; AN 84–221813 & JP–A–59 129 230 (Dainippon Ink Chem. KK.), 25. Juli 1984.

Database WPI, Derwent Publications Ltd., London, GB; AN 84–191772 & JP–A–59 108 033 (Dainippon Ink KK.), 22. Juni 1984.

Vysokomol. Soedin. Ser. A, 1984, H. 8, S. 1706–1711, Hochmolekularbericht, 1985, Ref. H. 5279/85.

Primary Examiner—Melvyn I. Marquis
Attorney, Agent, or Firm—Sprung Horn Kramer & Woods

[57] ABSTRACT

In the reaction of a polysiloxane with an alkoxysilane to produce polysiloxanes with special terminal groups, the improvement which comprises effecting the reaction in the presence of fluoride ions as activator.

10 Claims, No Drawings

PREPARING REACTION PRODUCTS FROM POLY (DIORGANOSILOXANES)

This application is a continuation of application Ser. No. 08/421,824, filed on Apr. 13, 1995 which is abandoned.

The present invention relates to a process for preparing reaction products from poly(diorganosiloxanes) and alkoxysilanes.

The objective when reacting poly(diorganosiloxanes) with alkoxysilanes is to produce poly(diorganosiloxanes) with diorganyloxy-organosilyl or triorganyloxysilyl terminal groups. The following ways for doing this are shown in the literature:

1. Reaction of α,ω-dihydroxy-poly(diorganosiloxanes) with alkoxysilanes in the presence of suitable catalysts and
2. the reaction of α,ω-dihydroxy-poly-(diorganosiloxanes) with mixed functional silanes, such as e.g. alkoxyamidosilanes (DE-PS 1,247,646), alkoxy-oximosilanes (EP 98,369) and alkoxy-acetoxysilanes (U.S. Pat. No. 3,296,165), without an additional catalyst.

Known catalysts for the method first described, are mainly amines (EP 21,859) mixed with metal carboxylates (U.S. Pat. No. 3,161,614) and amines mixed with carboxylic acids (EP 137,883), ammonium carbamates, preferably $(CH_3)_2NH_2OCON(CH_3)_2$ (DE-PS- 3,523,206) and hydroxylamine derivatives (EP 70,786).

All the catalysts or catalysts systems described hitherto for use during the production of alkoxy-terminated polysiloxanes, however, require long reaction times and elevated temperatures. In addition, the catalysts have to be used in substantial amounts, their removal from the polymer generally being difficult or even impossible. These disadvantages can be eliminated by the use of alkali metal hydroxides and alcohols (DE-OS 4,022,661, EP-A 457,693, EP-A-376,696) as catalysts. The high degree of activation produced by hydroxide ions or alcoholate ions, however, leads to unwanted side reactions such as, e.g. polymer rearrangements, so the catalyst has to be inactivated by neutralization as rapidly as possible after termination of the reaction.

In the second case, the silanes used, in contrast to pure organyloxy or organyloxyorganosilanes, are sufficiently reactive to react with α,ω-dihydroxy-poly(diorganosiloxanes) without the use of catalysts. Production of the silanes, however, is costly and removal of the cleavage products is difficult or impossible.

Principally for economic reasons, the last mentioned method, with the use of appropriate catalysts, is preferred for the reaction of α,ω-dihydroxy-poly(diorganosiloxanes) with alkoxysilanes.

The object of the invention is the provision of a process for reacting poly(diorganosiloxanes) with alkoxysilanes, which particularly permits the production of poly (diorganosiloxanes) with diorganyloxy-organosilyl or triorganyloxysilyl terminal groups after a shorter reaction time even at room temperature.

Surprisingly, it has now been found that the reaction of poly(diorganosiloxanes) and alkoxysilanes in the presence of fluorides leads to the production of alkoxy-terminated poly(diorganosiloxanes) within a few minutes even at room temperature and in addition the fluoride ions introduced in this mixture are suitable for the controlled degradation of high-molecular poly(diorganosiloxanes) with extended reaction times.

The present invention therefore provides a process for preparing reaction products from poly(diorganosiloxanes) and alkoxysilanes, wherein the reaction is performed in the presence of fluoride ions as activator.

A polysiloxane for use in the sense of the invention is a polysiloxane or a mixture of several polysiloxanes of the formula (I)

in which

R, $R^1$ may be a $C_1$–$C_{18}$-alkyl or alkoxy group, phenyl or substituted phenyl or a $C_2$–$C_{18}$-alkenyl or alkoxyalkyl group and R may be identical to or different from $R^1$, $R^2$, $R^3$ may be H—, a $C_1$–$C_{18}$-alkyl, $C_6$–$C_{14}$-aryl or $SiR^5_3$ group, where $R^5$=a $C_1$–$C_{18}$-alkyl/alkoxy, $C_6$–$C_{14}$-aryl, $C_2$–$C_{18}$-alkenyl or alkoxyalkyl group, wherein $R^2$ and $R^3$ may be identical or different, and x=10 to 10,000.

In a preferred embodiment, the polysiloxane has a network structure.

Examples of these polysiloxanes with a network structure are vulcanized elastomers such as, for example, high-temperature vulcanizing (HV), liquid silicone (LSR), room temperature vulcanizing (RTV) single component (1C) or two-component (2C) elastomers.

The network structure of the polysiloxanes can be built up, inter alia, by means of

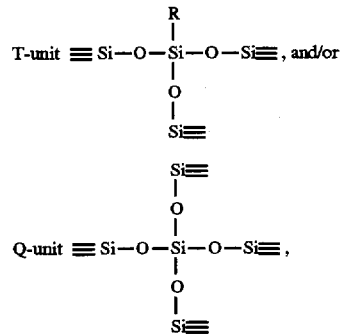

and groups which are formed by hydrosilylation or peroxidic cross-linking reactions such as alkylene groups.

An alkoxysilane for use in the sense of the invention is at least one alkoxysilane or a mixture of several alkoxysilanes of the formula (II)

in which $R^6$ represents an optionally substituted $C_1$–$C_6$-alkyl, $C_2$–$C_8$-alkoxyalkyl group, or a $C_5$–$C_7$-cycloaliphatic hydrocarbon group, $R^7$ represents an optionally substituted $C_1$–$C_{10}$-alkyl, $C_2$–$C_{10}$-alkenyl, phenyl or substituted phenyl group, and n is 0, 1 or 2.

Particularly preferred alkoxysilanes are tetraethoxysilane, methyltrimethoxysilane, methyltriethoxysilane, vinyltriethoxysilane and dimethyldimethoxysilane. Also suitable are alkoxysilanes with substituents in the alkyl group such as, for example, $XCH_2CH_2CH_2(OR^1)_3$, where X=HS—, $H_2N$—, $R_2N$—, Cl— and other substituents.

Activators in the sense of the invention are metal and non-metal fluorides which are soluble in the system.

Metal fluorides in the sense of the invention are preferably alkali metal fluorides such as, e.g. sodium fluoride, potassium fluoride, and the like. Non-metal fluorides are preferably used as sources of fluoride ions. Ammonium trifluoride and/or tetraalkylammonium fluorides are particularly preferred, in particular tetrabutylammonium fluoride, and trialkylamine hydrofluorides such as, for instance, triethylamine trishydrofluoride [$(C_2H_5)_3N\cdot 3HF$] and other polyhydrofluorides of tertiary organic amines. The activators may be added to the reaction mixtures either in the pure form or in the dissolved state in suitable solvents or in alkoxysilanes. Alcohols and alkoxysilanes have proved to be particularly suitable solvents.

Using the present invention, it has been established that very low concentrations of fluoride ions are sufficient to function as an activator in the reaction. In the process according to the invention for preparing reaction products from polysiloxanes and alkoxysilanes 0.001 to 5 wt. %, preferably 0.001 to 1 wt. %, in particular 0.001 to 0.5 wt. % of fluoride ions, with respect to the total mixture, are preferably used.

The process according to the invention takes place at temperatures between 0° and 300° C.

In a preferred embodiment of the present invention, the process for reacting polysiloxanes and alkoxysilanes in the presence of fluoride ions is terminated after the production of triorganylsilyl or diorganyloxy-organylsilyl-terminated poly(diorganosiloxanes) by precipitating the fluoride ions as barely soluble alkaline earth metal fluorides, wherein the polysiloxanes of the formula (I) used have at least one OH function available. Polysiloxanes with a content of 0.01 to 19 wt. % of SiOH, with respect to the polymer, in particular α,ω-dihydroxy-poly(diorganosiloxanes), are preferably used.

All the previously described alkoxysilanes with formulae analogous to the formula (II) and all the previously described alkali metal and non-metal fluorides may also be used. Termination of the reaction can be achieved by adding alkaline earth metal ions. In this case, barely soluble alkaline earth metal fluorides are formed which can no longer act as activators in the system. Any alkaline earth metal salts which are soluble in this system are suitable as alkaline earth metal compounds. Calcium chloride is particularly suitable. In order to achieve the greatest possible distribution in the reaction mixture and the shortest possible reaction times, the alkaline earth metal salts are added to the reaction mixture in dissolved form. Alcohols such as methanol and ethanol have proved to be particularly appropriate solvents.

The amount of alkaline earth metal compound used depends on the concentration of fluoride ions in the reaction mixture. The alkaline earth metal ions must be used in at least a stoichiometric ratio, with respect to the fluoride ions; a 20 to 100% strength excess, with respect to the amount which is stoichiometric with respect to fluoride has proved advantageous.

The reaction conditions during the reaction of poly (diorganosiloxanes) and alkoxysilanes depends on the reactivity of the alkoxysilane used and the reaction products which are desired. The process according to the invention takes place at temperatures between 0° and 300° C., preferably 15° to 60° C., in particular 18° to 40° C. and specifically at room temperature. The reaction time is then at least 3 minutes, preferably 5 to 30 minutes. The reaction time depends on the desired degree of termination. The particularly preferred duration of reaction at room temperature is less than 10 minutes.

If the polymer is intended for preparing RTV-1C (room temperature vulcanizing single component) materials, then a one-pot process is used in the mixing unit.

In another embodiment of the present invention, the reaction of polysiloxanes with alkoxysilanes in the presence of fluoride ions at temperatures between 0° and 300° C. lasts for at least 5 minutes.

In this embodiment of the process according to the invention, polysiloxanes of the formula (I) are used. Preferably, however, the previously mentioned polysiloxanes with a network structure are used. Likewise, all the previously described alkoxysilanes with formulae analogous to formula (II) and all the previously described metal and non-metal fluorides can be used.

In this embodiment of the process according to the invention, compounds of the general formula (III)

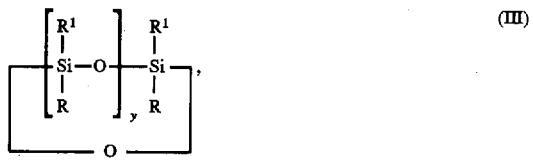

(III)

in which

R, $R^1$ represent linear or branched $C_1$–$C_{18}$-alkyl or $C_1$–$C_{18}$-alkoxy, $C_6$–$C_{14}$-aryl, $C_2$–$C_{18}$-alkoxyalkyl/alkenyl groups and R may be identical to or different from $R^1$, and y=3 to 20, preferably y=3 to 6, in particular y=3, are preferably prepared as low-molecular siloxanes.

In a further embodiment, linear and/or branched short-chain siloxanes of the general formula (IV)

(IV)

in which

R, $R^1$ represent $C_1$–$C_{18}$-alkyl or $C_1$–$C_{18}$-alkoxy, $C_6$–$C_{14}$-aryl, $C_2$–$C_{18}$-alkoxyalkyl/alkenyl groups and R may be identical to or different from $R^1$, $R^4$ represents a $C_1$–$C_{18}$-alkyl group or —$SiR^5_3$ where $R^5$=$C_1$–$C_{18}$-alkoxy/alkyl, $C_6$–$C_{14}$-aryl or $C_2$–$C_{18}$-alkenyl/alkoxyalkyl and z is 1 to 200, preferably 3 to 100 and in particular 3 to 10, are preferably prepared as low-molecular siloxanes.

Low-molecular, branched, short-chain siloxanes of the formula (IV), however, may also be produced admixed with low-molecular rings of the formula (III).

The reaction may be performed either at room temperature or at elevated temperature. The reaction time depends on the type of poly(diorganosiloxane) used and the temperature. It may be between a few hours and several days. The volatile reaction products, such as cyclic diorganosiloxanes, may be separated from the reaction mixture by distillation under reduced pressure. Reaction of polysiloxanes and alkoxysilanes in the presence of fluoride ions may also be performed in solvents. Any organic solvent such as, for instance, toluene, xylene, alcohol or even low viscosity poly(diorganosiloxanes) or cyclic diorganosiloxanes may be considered as a solvent.

The process according to the invention is explained in more detail by means of the following examples.

WORKING EXAMPLES

To check the termination procedure, the products from the examples and the comparison examples were tested as follows:

1. viscosity determination using a Haake rotational viscometer,
2. cross-linking test and
3. determination of the SiOH content by FT-IR differential spectroscopy.

In the cross-linking test described under 2, 20 parts by wt. of the mixture being tested were cross-linked with 1 part by wt. of a test solution. This test solution was prepared by dissolving 40% of dibutyltin oxide in tetraethyl silicate at 100° C. If, after adding the test solution, a rapid increase in viscosity and gelling of the mixture is observed, then this is taken to indicate incomplete reaction of the SiOH groups. If this type of behavior is not observed and the material cures under the effects of atmospheric moisture, then it can be concluded that a successful termination reaction has occurred.

Example 1

A mixture of 55 parts by wt. of an OH-terminated poly(dimethylsiloxane) with a viscosity of 80 Pa.s and 29 parts by wt. of a trimethylsilyl-terminated poly (diorganosiloxane) with a viscosity of 100 mPa.s was initially placed in a planetary mixer. 2.5 parts by wt. of methyltrimethoxysilane which contained 1.0 wt. % of tetrabutylammonium fluoride were added to this mixture. After 10 minutes 0.55 parts by wt. of a solution of 1 wt. % of calcium chloride in ethanol were added.

The polymer mixture had a viscosity of 15.7 Pa.s immediately after preparation, and this did not alter in repeat measurements which were performed after one day and 7 days. No SiOH groups could be detected by means of FT-IR spectroscopy. The cross-linking test did not show rapid gelling, but, after 24 hours in the presence of moisture, a 2 mm thick layer had thoroughly hardened to produce a test sample. From these results it was concluded that the desired termination reaction had taken place.

Example 2 (Comparison Example)

Example 1 was repeated without adding a catalyst and using methyltrimethoxysilane. The mixture had a viscosity of 16.5 Pa.s and an SiOH content of 0.16 wt. %. On adding the test solution in the cross-linking test, intense gelling occurred.

Example 3 (Comparison Example)

Example 1 was repeated without adding the calcium chloride solution. The viscosity of the polymer decreased greatly and after 24 hours was about 1 Pa.s. The SiOH content was a maximum of 0.01 wt. %. In the cross-linking test, there was neither gelling nor cross-linking of the material after 24 hours.

Example 4

Example 1 was repeated with the addition of 0.92 parts by wt. of a solution of 1 wt. % of calcium chloride in ethanol. The viscosity of the polymer mixture was 15.0 Pa.s and did not alter over the course of 7 days. SiOH groups could no longer be detected and the cross-linking test did not produce any gelling. A fully cured test sample was produced after 24 hours.

Example 5

Example 1 was performed with the addition of 1.25 parts by wt. of methyltrimethoxysilane and 1.25 parts by wt. of a methyltrimethoxysilane with 1 wt. % of tetrabutylammonium fluoride. After 15 minutes, 0.27 parts by wt. of a solution of 1% of calcium chloride in ethanol were added. SiOH groups could no longer be detected. The viscosity remained unaltered at 18.2 Pa.s over an interval of 7 days. In the cross-linking test, no gelling was observed.

Example 6

Example 1 was performed using 2.5 parts by wt. of methyltrimethoxysilane and 0.25 parts by wt. of a solution of 10% of tetrabutylammonium fluoride in methanol. Deactivation of the fluoride ions was performed by adding 0.6 parts by wt. of a solution of 1% of calcium chloride in ethanol after 10 minutes. The cross-linking test led to no gelling and the SiOH content was at most 0.01%.

Example 7

This example demonstrates using the process according to the invention to produce a RTV-1C material in a one-pot process during the course of a compounding procedure.

55 parts by wt. of an OH-terminated poly (dimethylsiloxane) with a viscosity of 80 Pa.s and 29 parts by wt. of a trimethylsilyl-terminated poly(dimethylsiloxane) with a viscosity of 100 mPa.s were initially introduced into a planetary mixer. Then, 2.5 parts by wt. of a solution of 1% of tetrabutylammonium fluoride in methyltrimethoxysilane were stirred in and left for 10 minutes. The termination reaction was concluded by adding 0.55 parts by wt. of a solution of 1% of calcium chloride in ethanol. Then, 9.5 parts by wt. of a hydrophobized, pyrogenic silica (BET surface area 110 m$^2$/g) were added and stirred slightly. Afterwards, 1 part by wt. of a titanium diisobutoxy-bis-ethyl-acetate chelate was added and stirred in. Incorporation of the titanium complex proceeded without any problem. Since, when using OH-terminated polymers, an undesirable increase in viscosity is generally observed after adding a titanium catalyst, it can be concluded that the termination reaction of the polymer had finished.

The mixture was placed in cartridges. To check the mechanical data, 2 mm thick compacted sheets were drawn out and a tensile/stretching test was performed in accordance with DIN 53 504 after curing for 14 days at 23° C. and 50% relative humidity.

| | |
|---|---|
| Tensile stress at 100% extension | 0.32 [MPa] |
| Tear strength | 1.80 [MPa] |
| Elongation at break | 670 [%] |
| Hardness (after 21 days, DIN 53505) | 21 Shore A |

The paste showed no noticeable differences from the behavior of freshly prepared material and was in perfect condition when the mechanical tests were repeated after storing for 3 months in cartridges at room temperature and 50° C.

Example 8

42 parts by wt. of an OH-terminated poly-(dimethylsiloxane) with a viscosity of 80 Pa.s and 18 parts by wt. of a trimethylsilyl-terminated poly(dimethylsiloxane) with a viscosity of 100 mPa.s were initially placed in a planetary mixer. Then, 2 parts by wt. of a solution of 1% of tetrabutylammonium fluoride in methyltrimethoxysilane were stirred in and 0.55 parts by wt. of a solution of 1% of calcium chloride in ethanol were added after 10 minutes standing time. 30 parts by wt. of chalk milled with stearic acid and 5.5 parts by wt. of a hydrophobized pyrogenic silica (BET surface area 110 m²/g) were then added and stirred slightly. Afterwards, 1 part by wt. of a titanium diisobutoxy-bis-ethyl-acetate chelate was added and stirred in. Incorporation of the titanium complex proceeded without any problem. Checking the mechanical properties in accordance with Example 7 produced the following results:

| | |
|---|---|
| Tensile stress at 100% extension | 0.49 [MPa] |
| Tear strength | 1.71 [MPa] |
| Elongation at break | 599 [%] |
| Hardness (after 21 days, DIN 53505) | 25 Shore A |

It will be understood that the specification and examples are illustrative but not limitative of the present invention and that other embodiments within the spirit and scope of the invention will suggest themselves to those skilled in the art.

I claim:

1. A process for the production of triorganyloxysilyl or diorganyloxy-organosilyl-terminated poly(diorganosiloxanes) wherein at least one polysiloxane of the formula

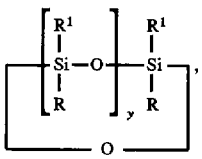

in which

R and $R^1$ each independently is $C_1$–$C_{18}$-alkyl or alkoxy, phenyl or substituted phenyl or a $C_2$–$C_{18}$-alkenyl or alkoxyalkyl group, $R^2$ and $R^3$=H, X=10–10,000 is reacted with an alkoxysilane in the presence of fluoride ions as activator and wherein, after the production of the triorganyloxysilyl or diorganylsilyl-terminated poly(diorganosiloxanes), the reaction is terminated by precipitating the fluoride ions by the addition of alkaline earth metal ions.

2. In the reaction of polysiloxane wherein at least one polysiloxane of the formula

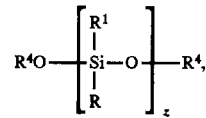

in which

R and $R^1$ each independently is $C_1$–$C_{18}$-alkyl or alkoxy, phenyl or substituted phenyl or a $C_2$–$C_{18}$-alkenyl or alkoxyalkyl group, $R^2$ and $R^3$ each independently is a $C_1$–$C_{18}$-alkyl, $C_6$–$C_{14}$-aryl or $SiR^5_3$ group, $R^5$ is a $C_1$–$C_{18}$-alkyl or a $C_6$–$C_{14}$-aryl, $C_2$–$C_{18}$-alkenyl or alkoxyalkyl group, X=10 to 10,000, or a polysiloxane having a network structure is reacted with an alkoxysilane to produce products according to formula III and IV,

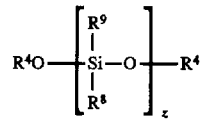

wherein $R^4$ represents a $C_1$–$C_{18}$-alkyl group or —$SiR^5_3$ where $R^5$=$C_1$–$C_{18}$-alkoxy/alkyl, $C_6$–$C_{14}$-aryl or $C_2$–$C_{18}$-alkenyl/alkoxyalkyl and z is 1 to 200, the improvement comprises effecting the reaction in the presence of fluoride ions as activator.

3. A process according to claim 2, wherein the polysiloxane produced is a linear or branched short-chain siloxane of the formula

in which $R^8$ and $R^9$ each independently is a $C_1$–$C_{18}$-alkyl, $C_1$–$C_{18}$-alkoxy, $C_8$–$C_{14}$-aryl or $C_2$–$C_{18}$-alkoxyalkyl or alkenyl group, $R^4$ is a $C_1$–$C_{18}$-alkyl group or —$SiR^5_3$, $R^5$ is a $C_1$–$C_{18}$-alkoxy or alkyl, $C_6$–$C_{14}$-aryl or $C_2$–$C_{18}$-alkenyl or alkoxyalkyl, and z is 1 to 200.

4. A process according to claims 1 or 2, wherein the alkoxysilane comprises at least one alkoxysilane of the formula

in which $R^6$ is an optionally substituted $C_1$–$C_8$-alkyl or $C_2$–$C_8$-alkoxyalkyl group, or a $C_5$–$C_7$-cycloaliphatic hydrocarbon group, $R^7$ is an optionally substituted $C_1$–$C_{10}$-alkyl, $C_2$–$C_{10}$-alkenyl, phenyl or substituted phenyl group, and n is 0, 1 or 2.

5. A process according to claims 1 or 2, wherein the source of the fluoride ions is a non-metal fluoride.

6. A process according to claims 1 or 2, wherein the source of the fluoride ions is at least one compound selected from the group consisting of tetraalkylammonium fluorides, ammonium fluoride, and trialkylamine hydrofluorides.

7. A process according to claims 1 or 2, wherein the source of the fluoride ions is an alkali metal fluoride.

8. A process according to claims 1 or 2, wherein the fluoride ions are present in 0.001 to 5 wt. %, of the total mixture.

9. A process according to claim 2, wherein the the starting alkoxysilane comprises at least one alkoxysilane of the formula

in which $R^6$ is an optionally substituted $C_1$–$C_6$-alkyl or $C_2$–$C_8$-alkoxyalkyl group, or a $C_5$–$C_7$-cycloaliphatic hydrocarbon group, $R^7$ is an optionally substituted $C_1$–$C_{10}$-alkyl, $C_2$–$C_{10}$-alkenyl, phenyl or substituted phenyl group, and n is 0, 1 or 2, the source of the fluoride ions is at least one compound selected from the group consisting of alkali metal fluorides, tetraalkylammonium fluorides, ammonium fluorides and trialkylamine hydrofluorides, the reaction is conducted for at least 5 minutes at a temperature between 0° and 300° C., and wherein after the production of triorganyloxysilyl or diorganylsilyl-terminated poly(diorganosiloxanes), the reaction is terminated by precipitating the fluorine ions by the addition of alkaline earth metal ions.

10. A process according to claims 1 or 2, wherein the reaction time is at least 5 minutes at a temperature between 0° and 300° C.

\* \* \* \* \*